Patented Feb. 8, 1949

2,461,404

UNITED STATES PATENT OFFICE 2,461,404

EXTRACTION OF PROTEIN FROM SEEDS

Robert Louis Wormell and Alfred Frank Millidge, Coventry, and Claude Leonard Knight, Kenilworth, England, assignors to Courtaulds Limited, London, England, a British company No Drawing. Application January 17, 1947, Serial No. 722,748
In Great Britain February 19, 1946

7 Claims. (Cl. 260—112)

This invention relates to the extraction of protein, otherwise known as vegetable casein, from protein-containing seeds such as bean or pea meal, nut meal and the like.

The ordinary method of extracting protein from seeds consists in extracting the oil-free meal with dilute alkaline solutions, and subsequently filtering and centrifuging the extract. This method normally yields a liquor which is cloudy, due to the presence of particles so finely dispersed that they are not removed by ordinary separation processes. Moreover, when the protein is precipitated by the addition of acid sufficient to lower the pH value of the liquor to the isoelectric point, the dispersed particles are co-precipitated with the protein. When it is desired to form spinning solutions the protein so precipitated is dissolved in dilute alkali such as dilute caustic soda solution and it is well-known that the solutions so obtained are normally cloudy and unstable; in particular the solutions suffer rapid changes in viscosity, darken in colour and also tend to form a skin on the liquor-air interface. It is believed that this instability is at least partly due to the presence of soluble polysaccharides such as starches in the protein solutions.

It has already been proposed to separate the colouring matter from protein-containing seeds prior to the extraction of the protein by leaching the meal with a dilute acid having a pH value around the isoelectric point (4.8 to 4.2) and then extracting the protein from the thus-treated meal. United States specification No. 2,260,640 describes a process for the treatment of seeds rich in protein that have an alkaline reaction in water which includes the steps of treating said seeds in divided form with a gas having an acid reaction in water sufficient to give a pH in the water of 4.8 or lower and then of washing the so-treated seed material with an acid solution of a pH at which the protein thereof is relatively insoluble, to remove from said material colouring and other non-protein matters.

It is also known to extract vegetable proteins by using dilute acid solutions. United States Patent No. 2,272,562, for example, describes a process for manufacturing vegetable proteins by dissolving the proteins of the vegetable raw materials in N/10–N/1 sulphurous acid, and then adjusting the hydrogen ion concentration of the extraction liquid nearly to the iso-electric point of the proteins to be precipitated. United States Patent No. 2,272,563 describes a process for extracting vegetable proteins by dissolving the proteins of the vegetable raw materials in N/10–N/1 sulphurous acid and from the extraction liquid thus obtained evaporating and expelling the sulphur dioxide at normal or elevated temperatures and under normal or reduced pressures, until the hydrogen ion concentration of the liquid is adjusted nearly to the iso-electric point of the proteins, in order to precipitate the latter.

This invention comprises a method of pretreating protein-containing seeds prior to the extraction of the protein comprising the steps of impregnating the seeds with a dilute aqueous solution of an inorganic acid chosen from the group consisting of sulphuric acid, hydrochloric acid and phosphoric acid, removing water from the impregnated seeds to concentrate the acid on the seeds by heating the impregnated seeds at a temperature which is below the carbonisation temperature of the seeds, and subsequently washing the seeds until they are free from acid.

The invention also includes a process for the production of solutions of protein from protein-containing seeds which comprises the steps of impregnating the seeds with a dilute aqueous solution of an inorganic acid chosen from the group consisting of sulphuric acid, hydrochloric acid and phosphoric acid, removing water from the impregnated seeds to concentrate the acid on the seeds by heating the impregnated seeds at a temperature which is below the carbonisation temperature of the seeds, washing the seeds until they are free from acid and subsequently forming a solution by extracting the protein from the seeds with an aqueous alkaline solution.

The solutions obtained by pretreating and subsequently extracting the protein with aqueous alkaline solutions in accordance with the invention are stable and do not discolour on standing. It is believed that these improvements are due to the removal of impurities such as polysaccharides from the seeds. The pretreatment of the seeds also effects denaturation of the protein which is advantageous when it is desired to spin the protein into threads.

The seeds are preferably employed in the oil-free condition, and after being finely ground to form so-called meal.

The pretreatment according to the invention may be effected by soaking the seeds in a dilute acid solution, that is to say, an acid solution having a pH value of not greater than 2.0, and then removing water to concentrate the acid by heating the impregnated seeds at, for example, 40 to 70° centigrade in an air oven. If desired a metallic bisulphate such as sodium bisulphate may be used as the source of sulphuric acid, since bisulphates function as a mixture of sulphuric acid and a metal sulphate. Similarly salts giving rise to hydrochloric acid on heating in the presence of water, for example magnesium chloride, may be used as the source of hydrochloric acid.

It is important that when the seeds are heated to remove water the conditions should be such that no substantial carbonisation of the meal occurs. The actual carbonisation temperature of the seeds undergoing treatment varies from batch to batch but a test on a small sample will readily determine the safety temperature for any particular batch of seeds.

When using sulphuric acid or phosphoric acid, the heating step to remove water to effect concentration of acid on the seeds is preferably carried out until the ratio of acid to water is within the range 1 part of acid to 0.1 to 1.5 parts of water. The ratio of acid to water may be readily determined by weighing the seeds initially treated with the dilute acid and weighing the seeds after heating, the difference in weight giving the amount of water lost by the acid. However, when using hydrochloric acid, which is a more active acid in this connection than either sulphuric acid or phosphoric acid, the ratio of acid to water may conveniently be 1 to more than 1.5 for example 1:3 with good results.

The washing of the seeds after concentration of the acid may be effected with warm water.

The extraction of the seeds pretreated according to this invention may be effected by the use of dilute alkaline solutions by the usual known methods but the extraction method described in our United States Patent No. 2,406,650 is preferably employed, particularly when it is desired to produce threads from the protein, since this method gives directly a stable spinnable solution. If it is desired to produce dry protein for industrial or other purposes, the protein may be precipitated, for example, by the addition of dilute sulphuric acid or by passing sulphur dioxide into the extract.

The following examples illustrate the present invention, the parts referred to being by weight:

Example 1

500 grams of oil-free peanut meal (that is, finely ground seeds) were soaked in 750 cubic centimetres of N sulphuric acid and water was then removed to concentrate the acid by placing the mass on a porcelain tray in an air oven and heating at 50° centigrade for 24 hours. After heating the mass was washed four times by decantation with water, filtered off and dried.

The protein was then extracted from the pretreated meal in the following way:

50 grams of the dried pretreated meal were placed in a bottle and 120 cubic centimetres of water were added with stirring and the whole mixture was allowed to stand for 30 minutes; 20 cubic centimetres of 20 per cent aqueous caustic soda solution were then added. The mass was stirred for 30 minutes, and 30 cubic centimetres of alcohol and 30 cubic centimetres of water were then stirred in. The mass was centrifuged to separate solid from liquid and about 100 cubic centimetres of a protein-containing solution were obtained. The solution was stable and did not discolour on standing and was extruded directly into threads by standard methods.

Example 2

One part of oil-free peanut meal was soaked in one and a half parts by weight of N sulphuric acid and water was then removed to concentrate the acid to 75 per cent (that is until the ratio of acid to water was 1:⅓), by heating the mass in an air oven at 60° centigrade, the concentration being determined by following the loss in weight of the meal during the heating. The heating operation took about 4 hours. The meal was then left for a further 16 hours in a dessicator over 70 per cent sulphuric acid and it was then washed with cold distilled water until the washings were free from sulphate ions. The meal was then dried in air at 60° centigrade, the dry meal weighing 70 per cent of the weight of the original meal.

The protein in the pretreated meal was estimated as follows:

1 part of the pretreated meal was mixed for 30 minutes with a mixture of 20 parts of ethyl alcohol, 60 parts of water and 3.2 parts of N caustic soda solution, and the mixture was then centrifuged to separate solid from liquid. The protein in the solution was precipitated by passing sulphur dioxide gas at 40° centigrade into the solution (pH 10.5) until the pH reached 4.8. The precipitated protein was separated, washed and dried. The yield of protein was 72 per cent of the acid-treated meal.

Example 3

One part of oil-free peanut meal was mixed with one and a half parts of N sulphuric acid and water was removed to concentrate the acid to about 46 per cent by heating at 60° centigrade for 12 hours in an air oven. After heating, the meal was washed with warm distilled water until the washings were free from sulphate ions and the meal was then dried. The dry meal weighed 68 per cent of the original meal.

The protein in the pretreated meal was estimated by the method described in Example 2 and it was found that the yield of protein was 78 per cent of the acid-treated meal.

Example 4

One part of oil-free peanut meal was mixed with 2 parts of N/2 sulphuric acid and water was then removed to concentrate the acid to 90 per cent by heating in an air oven at 60° centigrade for 24 hours. After heating the meal was washed with cold water until the washings were free from sulphate ions and the meal was then dried. The dry meal weighed 70 per cent of the weight of the original meal.

The protein could be extracted from the meal as described in Example 1.

Example 5

1 part of oil-free peanut meal was mixed with 2 parts of 5 per cent aqueous phosphoric acid and water was removed to concentrate the acid by heating at 60° centigrade for 36 hours, the concentration of the acid being then 90 per cent. After heating, the meal was washed with cold water until the meal was free from phosphoric acid, and the meal was then filtered off and dried at 60° centigrade. The dry meal weighed 60 per cent of the weight of the original meal.

The protein could be extracted from the meal as described in Example 1.

Example 6

One part of oil-free peanut meal was mixed with two parts of N sulphuric acid and the mixture was placed in a vessel which was surrounded by a water-jacket and was capable of being evacuated. The outlet of the vessel was connected to a condenser and receiver and the vessel was then evacuated. The water in the meal was removed by raising the temperature of the water in the water-jacket to 95° centigrade, the water distilling over into the receiver. After 2 hours heating, distillation of the water had ceased, and the heating was stopped. The meal was then washed with water until it was free from acid and it was then dried. The dry meal weighed 54 per cent of the weight of the original meal.

*Example 7*

1 part of oil-free nut meal was mixed with 2 parts of N hydrochloric acid and water was then removed to concentrate the acid by heating the meal in an air oven at 60° centigrade for 16 hours; the concentration of the acid as determined by the quantity of water evaporated was then 26 per cent. After heating the meal was washed with cold water until it was free from acid and it was then dried. The weight of the meal obtained was about 60 per cent of the weight of the original meal.

*Example 8*

1 part of oil-free nut meal was mixed with 2 parts of an aqueous solution containing 8 per cent of magnesium chloride $MgCl_2$, (specific gravity of solution=1.06). Water was removed by heating the meal in an air-oven at 60° centigrade for 20 hours, the magnesium chloride being then completely converted to magnesium hexa hydrate. After heating the meal was washed with cold water and dried. The weight of the meal obtained was 65 per cent of the weight of the original meal.

*Example 9*

1 part of oil-free nut meal was mixed with 4 parts of N/2 sulphuric acid and water was removed to concentrate the acid to 30 per cent by heating the meal in an air-oven at 60° centigrade for 16 hours. After heating the meal was washed with cold water until it was free from acid and then dried. The meal obtained weighed 67 per cent of the weight of the original meal.

What we claim is:

1. A method of preparing protein-containing seeds for extraction of the protein comprising the steps of impregnating the seeds with not more than about four times their weight of a dilute aqueous solution of an acid chosen from the group consisting of sulphuric acid, hydrochloric acid and phosphoric acid, the pH value of the solution being not greater than 2.0, removing water from the impregnated seeds to concentrate the acid on the seeds to a concentration of at least 25 per cent by weight by heating the impregnated seeds at a temperature below the carbonization temperature of the seeds and subsequently washing the seeds until they are free from acid.

2. A method as claimed in claim 1 wherein oil-free protein-containing seeds are employed.

3. A method as claimed in claim 1 wherein the heat-treatment to remove water is conducted at a temperature within the range 40° to 70° centigrade.

4. A process for the production of solutions of protein from protein-containing seeds which comprises the steps of impregnating the seeds with not more than about four times their weight of a dilute aqueous solution of an acid chosen from the group consisting of sulphuric acid, hydrochloric acid and phosphoric acid, the pH value of the solution being not greater than 2.0, removing the water from the impregnated seeds to concentrate the acid on the seeds to a concentration of at least 25 per cent by weight by heating the impregnated seeds at a temperature below the carbonization temperature of the seeds, washing the seeds until they are free from acid and subsequently forming a protein-solution by extracting the protein from the seeds with an aqueous alkaline solution.

5. A process for the production of solutions of protein as claimed in claim 4 wherein oil-free protein-containing seeds are employed.

6. A process for the production of solutions of protein, suitable for spinning in the manufacture of threads, from protein-containing seeds which comprises the steps of impregnating the seeds with not more than about four times their weight of a dilute aqueous solution of an acid chosen from the group consisting of sulphuric acid, hydrochloric acid and phosphoric acid, the pH value of the solution being not greater than 2.0, removing water from the impregnated seeds to concentrate the acid on the seeds to a concentration of at least 25 per cent by weight by heating the impregnated seeds at a temperature below the carbonization temperature of the seeds, washing the seeds until they are free from acid and subsequently forming a solution suitable for spinning by extracting the protein from the seeds with a solution containing an alkaline reagent, water and less than 40 per cent of an organic solvent chosen from the group consisting of acetone and water miscible monohydric alcohols.

7. A process for the production of solutions of protein as claimed in claim 6 wherein oil-free protein-containing seeds are employed.

ROBERT LOUIS WORMELL.
ALFRED FRANK MILLIDGE.
CLAUDE LEONARD KNIGHT.

REFERENCES CITED

The following references are of record in the file of this patent:

UNITED STATES PATENTS

| Number | Name | Date |
|---|---|---|
| 2,238,329 | Julian et al. | Apr. 15, 1941 |
| 2,297,685 | Brier et al. | Oct. 6, 1942 |
| 2,304,099 | Julian et al. | Dec. 8, 1942 |
| 2,331,619 | Morse | Oct. 12, 1943 |
| 2,406,650 | Wormell | Aug. 27, 1946 |